United States Patent
Lee et al.

(10) Patent No.: US 8,313,197 B2
(45) Date of Patent: Nov. 20, 2012

(54) PATTERN PROJECTING APPARATUS, THREE DIMENSIONAL IMAGING APPARATUS HAVING THE SAME, AND VARIFOCAL LIQUID LENS BEING USED IN THE SAME

(75) Inventors: Jeong-yub Lee, Seoul (KR); Seung-wan Lee, Suwon-si (KR); Woon-bae Kim, Suwon-si (KR); Seung-tae Choi, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 586 days.

(21) Appl. No.: 12/487,688

(22) Filed: Jun. 19, 2009

(65) Prior Publication Data
US 2010/0046004 A1    Feb. 25, 2010

(30) Foreign Application Priority Data
Aug. 19, 2008  (KR) .......................... 10-2008-0081080

(51) Int. Cl.
G03B 21/26 (2006.01)
G03B 3/00 (2006.01)
G02B 1/06 (2006.01)
G02B 3/12 (2006.01)

(52) U.S. Cl. ............ 353/28; 353/62; 353/101; 359/665; 359/666

(58) Field of Classification Search ............ 353/28, 353/62, 101; 359/665, 666
See application file for complete search history.

(56) References Cited

U.S. PATENT DOCUMENTS
7,286,246 B2 * 10/2007 Yoshida ............ 356/605
7,369,321 B1 * 5/2008 Ren et al. ............ 359/666
2007/0076090 A1   4/2007 Alexander

FOREIGN PATENT DOCUMENTS
EP    1 471 327 A    10/2004

OTHER PUBLICATIONS
Extended European Search Report Dated Oct. 28, 2009.
* cited by examiner Primary Examiner — Georgia Y Epps
Assistant Examiner — Magda Cruz
(74) Attorney, Agent, or Firm — Sughrue Mion, PLLC

(57) ABSTRACT

A pattern projecting apparatus usable with a three-dimensional imaging apparatus includes a light generator which emits a light beam, and a pattern adjusting unit disposed in front of the light generator. The pattern adjusting unit forms a projection pattern on an object, and adjusts a focus of the light beam emitted from the light generator.

7 Claims, 15 Drawing Sheets

PATTERN PROJECTING APPARATUS, THREE DIMENSIONAL IMAGING APPARATUS HAVING THE SAME, AND VARIFOCAL LIQUID LENS BEING USED IN THE SAME

CROSS-REFERENCE TO RELATED APPLICATION

This application claims priority under 35 U.S.C. §119(a) from Korean Patent Application No. 10-2008-0081080 filed Aug. 19, 2008 in the Korean Intellectual Property Office, the disclosure of which is incorporated herein by reference in its entirety.

BACKGROUND

1. Field of the Invention

Apparatuses and methods consistent with the present invention relate to a three-dimensional imaging apparatus, and more particularly, to a pattern projecting apparatus usable with a three-dimensional imaging apparatus, a three-dimensional imaging apparatus having the same, and a varifocal liquid lens used in the same.

2. Description of the Related Art

Generally, a three-dimensional imaging apparatus forms a three-dimensional image of an object by the processes of projecting a predetermined pattern onto the object using a pattern projecting apparatus, forming a predetermined projection pattern on the object, and detecting the predetermined projection pattern using a detector.

In the three-dimensional imaging apparatus, a parallel light beam emitted from a light generator of the pattern projecting apparatus passes through a stripe shaped pattern portion disposed at the pattern projecting apparatus to form a stripe projection pattern on a surface of the object. At this time, the stripe pattern projected on the object is distorted corresponding to a contour of the object. The detector detects the distorted stripe pattern, and then, imaging software processes the distorted stripe pattern to form a three-dimensional image of the object.

Recently, mobile devices, such as a cellular phone, etc., have been performing various functions. For example, besides a phone function and a message transmitting function, the cellular phone also has various functions, such as a camera function, a game function, a music playing function, a broadcasting function, an internet function, etc. Therefore, a mobile device having a three-dimensional imaging function also is required. However, the related art three-dimensional imaging apparatus has a large pattern projecting apparatus so that the three-dimensional imaging apparatus cannot be installed at the mobile device, such as a cellular phone, etc., while still maintaining a compact size.

Therefore, it has been required to develop as compact a three-dimensional imaging apparatus as can be installed at a mobile device.

SUMMARY

Exemplary embodiments of the present invention overcome the above disadvantages and other disadvantages not described above. Also, the present invention is not required to overcome the disadvantages described above, and an exemplary embodiment of the present invention may not overcome any of the problems described above.

Exemplary embodiments of the present invention provide a pattern projecting apparatus usable with a three-dimensional imaging apparatus that can be formed in a compact size, a three-dimensional imaging apparatus having the same, and a varifocal liquid lens used in the same.

According to an aspect of the present invention, there is provided a pattern projecting apparatus usable with a three-dimensional imaging apparatus, the pattern projecting apparatus including a light generator; and a pattern adjusting unit disposed in front of the light generator, the pattern adjusting unit to have a pattern portion to form a projection pattern on an object, the pattern adjusting unit formed to adjust a focus of a light beam emitted from the light generator.

The pattern adjusting unit may include a varifocal liquid lens formed to adjust the focus of the light beam, and the varifocal liquid lens comprises a moving member.

The pattern portion may be formed on the moving member of the varifocal liquid lens.

The pattern portion may be formed in front of the moving member of the varifocal liquid lens and may be spaced apart from the varifocal liquid lens.

The moving member may be formed of an elastic membrane, and the varifocal liquid lens may include a frame to support the elastic membrane and an optical liquid received in a cavity that is formed below the elastic membrane within the frame.

The elastic membrane may include a polydimethylsiloxane (PDMS) membrane.

The pattern portion may include a concentric circle pattern, a horizontal stripe pattern, a vertical stripe pattern, and a lattice pattern.

The light generator may use one selected from a group consisting of infrared rays, visual rays, and ultraviolet rays as a light source.

According to another aspect of the present invention, there is provided a three-dimensional imaging apparatus including: a pattern projecting apparatus to project a pattern on an object, the pattern projecting apparatus including: a light generator; and a pattern adjusting unit disposed in front of the light generator, to have a pattern portion to form a projection pattern on the object, and formed to adjust a focus of light beam to emit from the light generator; at least one detector to detect the object on which the pattern is projected; and an image forming unit to use the pattern projected on the object that is detected by the at least one detector to form a three-dimensional image of the object.

According to another aspect of the present invention, there is provided a varifocal liquid lens usable with a pattern projecting apparatus, the varifocal lens including: a frame to have a cavity, a portion of the frame to correspond to a bottom of the cavity formed to be transparent for a light beam to pass; a moving member disposed on the frame to cover above the cavity; an optical liquid to fill between the cavity and the moving member; and a pattern portion disposed on the moving member.

The moving member may be formed of an elastic membrane, and the elastic membrane may be a PDMS membrane.

The PDMS membrane may have a thickness of a range between approximately 10 μm to approximately 200 μm.

The pattern portion may be formed of silicon (Si) on the PDMS membrane.

A thickness of the pattern portion may be approximately 0.2 μm or less.

Also, the moving member may include a polymer layer that is hydrophilic and has a good adhesive strength with respect to the PDMS membrane and a metal, the polymer layer is formed on the PDMS membrane, and the pattern portion is formed of the metal on the polymer layer.

The polymer layer may include a polyurea layer, and a thickness of the pattern portion may be approximately 0.2 μm or less.

A PDMS layer may be formed on the pattern portion.

The pattern portion may include a concentric circle pattern, a horizontal stripe pattern, a vertical stripe pattern, and a lattice pattern.

BRIEF DESCRIPTION OF THE DRAWINGS

The above and/or other aspects of the invention will become apparent and more readily appreciated from the following description of exemplary embodiments, taken in conjunction with the accompanying drawings of which.

Throughout the drawings, like reference numerals will be understood to refer to like parts, components and structures.

DETAILED DESCRIPTION OF EXEMPLARY EMBODIMENTS

Hereinafter, certain exemplary embodiments of the present invention will be described in detail with reference to the accompanying drawings.

The matters defined in the description, such as a detailed construction and elements thereof, are provided to assist in a comprehensive understanding of the invention. Thus, it is apparent that the present invention may be carried out without those defined matters. Also, well-known functions or constructions are omitted to provide a clear and concise description of exemplary embodiments of the present invention.

Figure 1:
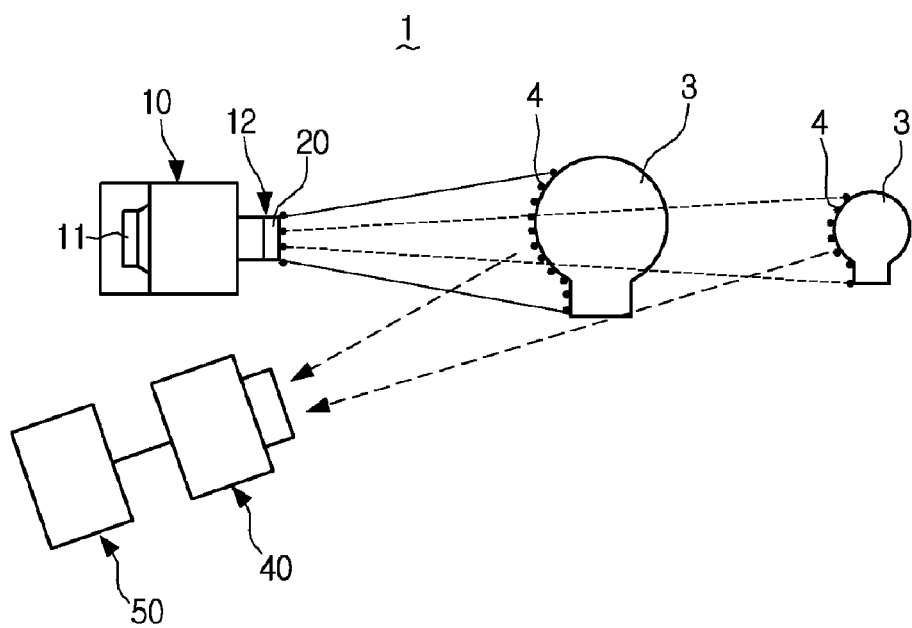
FIG. 1 is a conceptual view illustrating a three-dimensional imaging apparatus according to an exemplary embodiment of the present invention.

Referring to FIG. 1, a three-dimensional imaging apparatus 1 according to an exemplary embodiment of the present invention may include a pattern projecting apparatus 10, a detector 40, and an image forming unit 50.

Figure 2:
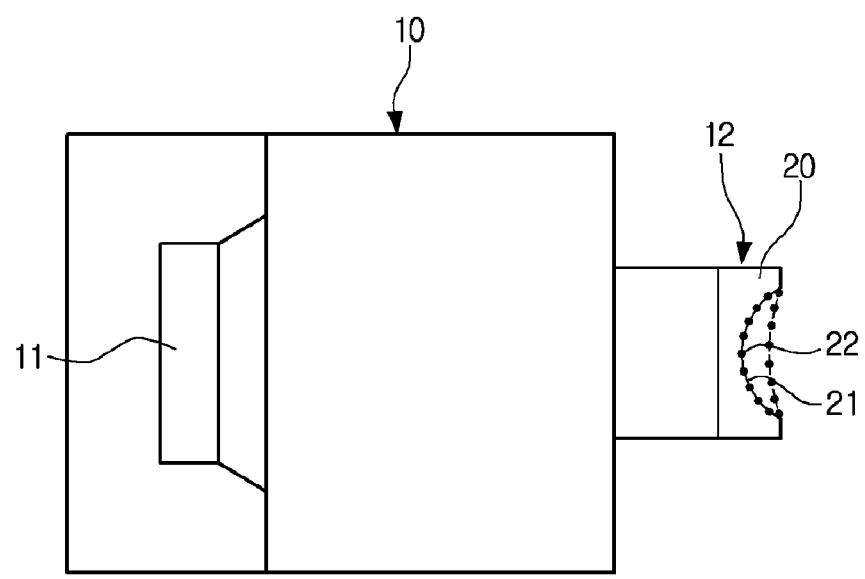
FIG. 2 is a view schematically illustrating a pattern projecting apparatus usable with a three-dimensional imaging apparatus according to an exemplary embodiment of the present invention.

The pattern projecting apparatus 10 projects a predetermined pattern onto an object and, as illustrated in FIG. 2, may include a light generator 11 and a pattern adjusting unit 12.

The light generator 11 generates a parallel light beam. The light generator 11 may include a light source to generate an infrared ray, a visible ray, and an ultraviolet ray. Also, a laser may be used as the light source to form the parallel light beam. When the light generator 11 has a general light source, such as a light emitting diode (LED), at least one collimating lens may be used to adjust light beam emitting from the general light source into the parallel light beam, that is, collimated light. A graded-index lens or gradient index lens (GRIN lens) may be used as the collimating lens.

The pattern adjusting unit 12 may be disposed in front of the light generator 11, and may include a pattern portion 22 to form a projection pattern 4 on the object 3. Also, the pattern adjusting unit 12 may be formed to adjust a focus of the light beam emitting from the light generator 11. Therefore, the pattern adjusting unit 12 may include a varifocal liquid lens 20 that is formed to adjust the focus of the light beam emitting from the light generator 11.

Figure 3:
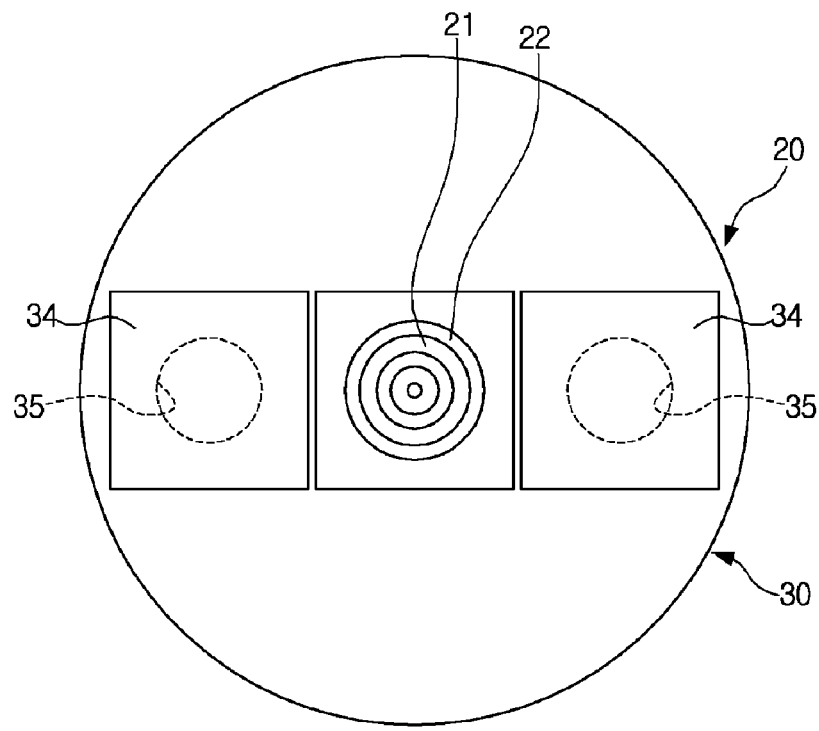
FIG. 3 is a plan view illustrating a varifocal liquid lens used for the pattern projecting apparatus of FIG. 1.
Figure 4:
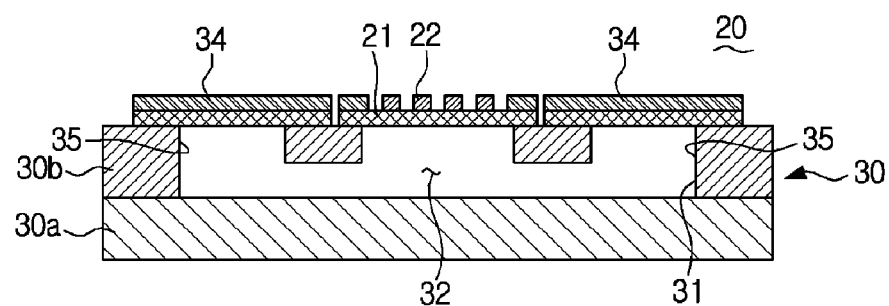
FIG. 4 is a sectional view illustrating the varifocal liquid lens of FIG. 3.

As illustrated in FIGS. 3 and 4, the varifocal liquid lens 20 may include a frame 30 and a moving member 21.

The frame 30 maintains a shape of the varifocal liquid lens 20, and may be formed of a rigid material that is hard to be deformed. A cavity 31 may be formed at a center portion of the frame 30. The cavity 31 may receive an optical liquid 32 through which the light beam can pass. The frame 30 may be formed of a transparent material so that the light beam can pass through the frame 30. Therefore, the frame 30 may be formed of a transparent glass wafer, a transparent polymer, a transparent plastic, etc.

Alternatively, the frame 30 may be formed so that only a portion of the frame 30 through which the light beam passes is transparent. In other words, only the portion of the frame 30 to form a bottom of the cavity 31 through which the light beam passes is formed to be transparent. For this, as illustrated in FIG. 4, the frame 30 may be formed to have a double structure. In other words, the frame 30 may have a bottom plate 30a formed of a transparent glass and a top plate 30b that is disposed on the bottom plate 30a, has a hole, and is formed of a material through which the light beam cannot pass. The hole of the top plate 30b and the bottom plate 30a may form the cavity 31. The top plate 30b may be formed of a silicon (Si) material.

The moving member 21 is disposed above the cavity 31 on the frame 30. The moving member 21 may be deformed corresponding to pressure to be applied to the optical liquid 32 in the cavity 31. For this end, the moving member 21 may be formed of an elastic membrane. In an exemplary embodiment, the elastic membrane 21 is formed of a polydimethylsiloxane (PDMS) membrane. The PDMS membrane may have a thickness in a range between approximately 10 μm to approximately 200 μm. Alternatively, the elastic membrane 21 may be formed of various materials that are transparent, have elasticity, and have durability even when each of the materials is formed of a thin membrane.

Furthermore, as illustrated in FIGS. 3 and 4, at least one driving member 34 may be disposed on a top surface of the frame 30 so that the at least one driving member 34 applies pressure to the optical liquid 32 within the cavity 31 so as to change a curvature of the moving member 21. The driving member 34 may be formed to deform corresponding to change of voltage or current to be applied to the driving member 34. A through hole 35 may be formed at the top surface of the frame 30 below the driving member 34. The through hole 35 is in fluid communication with the cavity 31 so that the deformation of the driving member 34 can apply pressure to the optical liquid 32.

Figure 5:
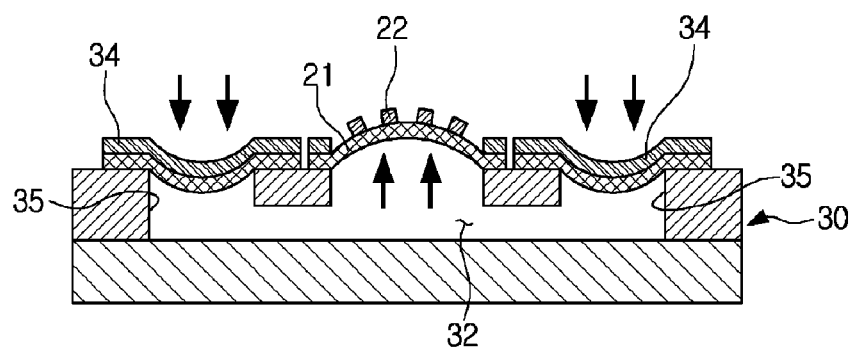
FIG. 5 is a sectional view illustrating the varifocal liquid lens of FIG. 4 to which pressure is applied.

As illustrated in FIG. 5, the driving member 34 is formed to apply pressure to the optical liquid 32 within the cavity 31 so that the moving member 21 is swelled upward. As the moving member 21 is swelled, the curvature of the moving member 21 changes so that the focus of the varifocal liquid lens 20 changes. The driving member 34 is the same as or similar to a driving member of the conventional varifocal liquid lens; therefore a detailed description thereof is omitted. Referring to FIGS. 4 and 5, the moving member 21 is formed to deform from a state parallel to the top surface of the frame 30 to a state swelled upward. However, this does not limit the structure of the moving member 21. Alternatively, the moving member 21, as illustrated in FIG. 2, may be configured to deform from a state to be sagging down with respect to the top surface of the frame 30 to a state raised upward. In the varifocal liquid lens 20 of FIG. 2, in order to clearly show movement of the moving member 21, the driving member 34 is omitted and the moving member 21 is enlarged.

Figure 6A:
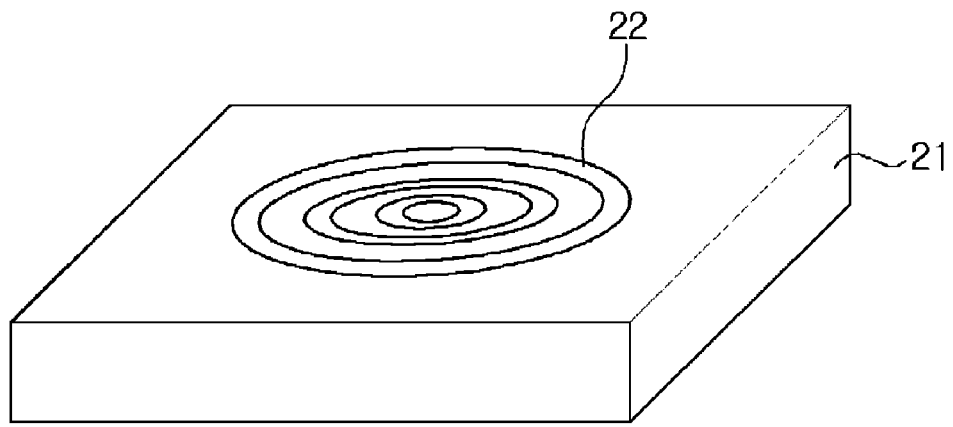
FIG. 6A is a perspective view illustrating a moving member with a silicon (Si) pattern portion formed thereon.
Figure 6B:
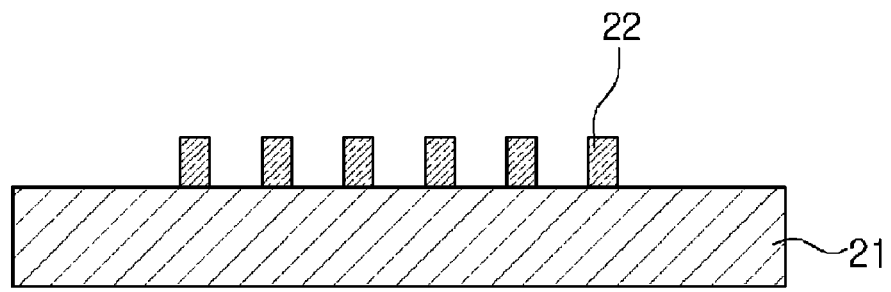
FIG. 6B is a sectional view illustrating the moving member of FIG. 6A.
Figure 7A:
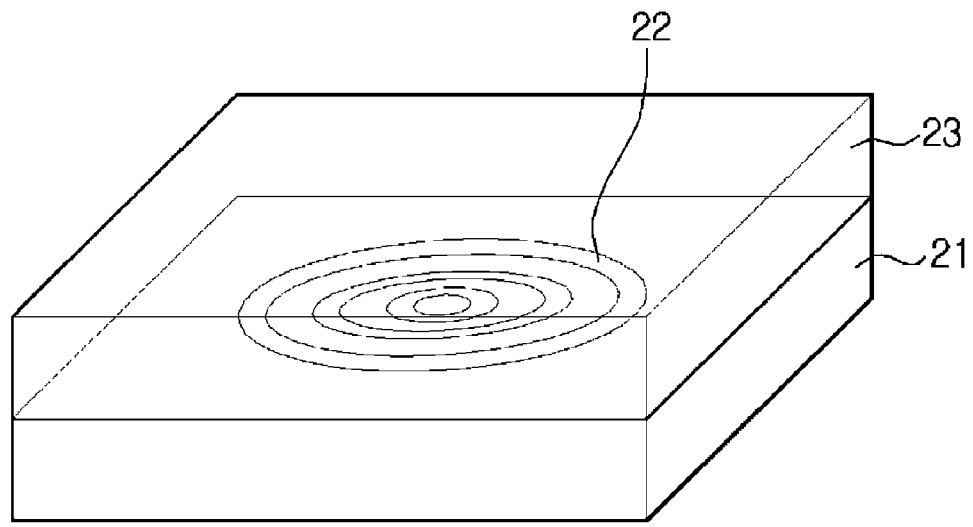
FIG. 7A is a perspective view illustrating a moving member with a sandwich structure in that a silicon pattern portion and a protection layer are stacked up in order on the moving member.
Figure 7B:
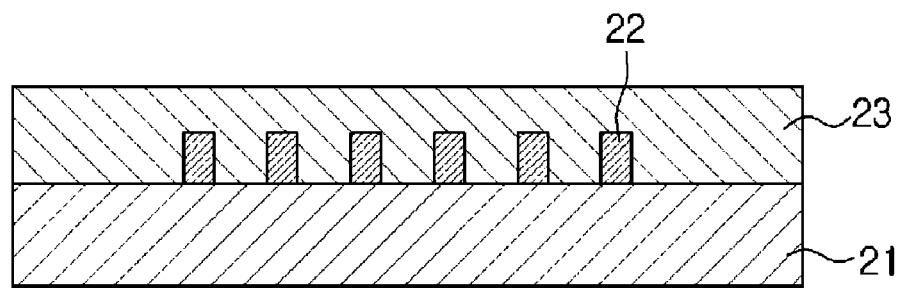
FIG. 7B is a sectional view illustrating the moving member of FIG. 7A.

The pattern portion 22 is formed on the moving member 21, that is, the PDMS membrane. The pattern portion 22 may be formed on a surface or at an inside of the moving member 21. In other words, the moving member 21 and the pattern portion 22 may be formed as a two-level structure as illustrated in FIGS. 6A and 6B or as a sandwich structure as illustrated in FIGS. 7A and 7B. The pattern portion 22 may be formed of a material that has a good adhesive strength with respect to the moving member 21 and can uniformly be coated on the moving member 21. For example, when the moving member 21 is formed of the PDMS membrane, the pattern portion 22 may be formed of silicon that has a good adhesive strength with the PDMS membrane and can uniformly be coated on the PDMS membrane.

FIG. 6A, FIG. 7A, FIG. 8A, and FIG. 9A are perspective views illustrating the moving member 21 and the pattern portion 22 formed thereon. FIG. 6B, FIG. 7B, FIG. 8B, and FIG. 9B are sectional views of FIG. 6A, FIG. 7A, FIG. 8A, and FIG. 9A, respectively. In FIG. 6B, FIG. 7B, FIG. 8B, and FIG. 9B, in order to clearly show the pattern portion 22, the pattern portion 22 is illustrated to have a thickness relatively large compared with the size of the moving member 21.

Referring to FIGS. 6A and 6B, there is the two-level structure in that the pattern portion 22 of silicon is formed on the top surface of the PDMS membrane 21. That is, the silicon pattern portion 22 is stacked up on the PDMS membrane 21. The pattern portion 22 may have a concentric circle pattern. The thickness of the PDMS membrane 21 may be approximately 10 μm to approximately 200 μm. The silicon pattern portion 22 may be formed to have the thickness of approximately 0.2 μm or less.

Referring to FIGS. 7A and 7B, there is the sandwich structure in that the silicon pattern portion 22 is formed on the top surface of the PDMS membrane 21 and a PDMS layer 23 as a protection layer is formed on the silicon pattern portion 22. That is, the PDMS membrane 21, the silicon pattern portion 22, and the PDMS layer 23 are stacked up in order. At this time, the silicon pattern portion 22 may have a concentric circle pattern and may be formed to have the thickness of approximately 0.2 μm or less. The PDMS layer 23 may be formed using liquid PDMS.

Figure 8A:
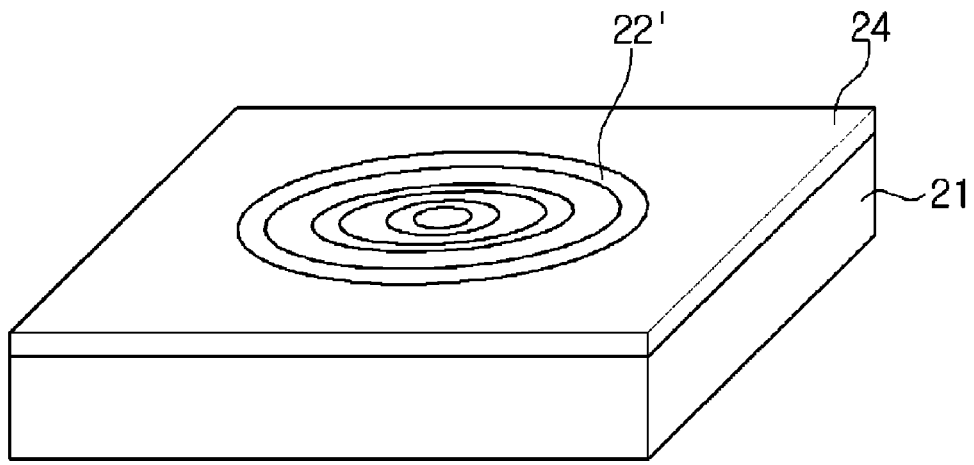
FIG. 8A is a perspective view illustrating a moving member with a metal pattern portion formed thereon.
Figure 8B:
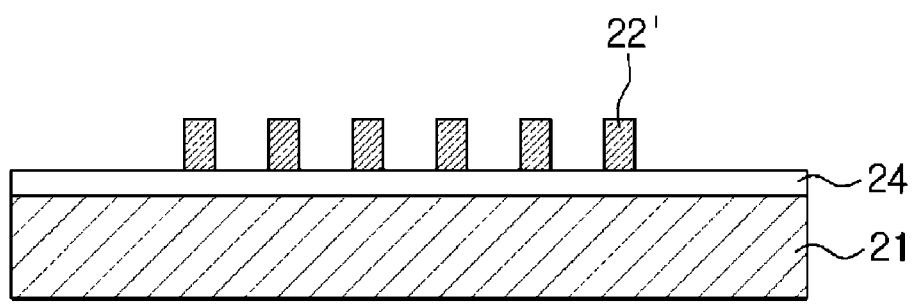
FIG. 8B is a sectional view illustrating the moving member of FIG. 8A.

Referring to FIGS. 8A and 8B, there is a pattern portion 22' formed of a metal. The metal hardly adheres to the PDMS membrane 21 so that a polyurea layer 24 to have good adhesive strength with respect to both metal and PDMS membrane 21 is formed on the PDMS membrane 21. Therefore, the PDMS membrane 21, the polyurea layer 24, and the metal pattern portion 22' are stacked up in order. The polyurea layer 24 may be formed on the PDMS membrane 21 using a vacuum deposition process, and have a thickness in a range between approximately 0.005 μm to approximately 1.0 μm. The metal pattern portion 22' may be formed to have a thickness of approximately 1.0 μm or less.

In the above explanation, the polyurea layer 24 is used to attach the metal to the PDMS membrane 21. However, this does not limit materials to be used to attach the metal to the PDMS membrane 21. Instead of the polyurea, various polymers having a hydrophilic property, which provides a good adhesive strength with respect to both metal and PDMS membrane 21, may be used in order to attach the metal to the PDMS membrane 21.

Figure 9A:
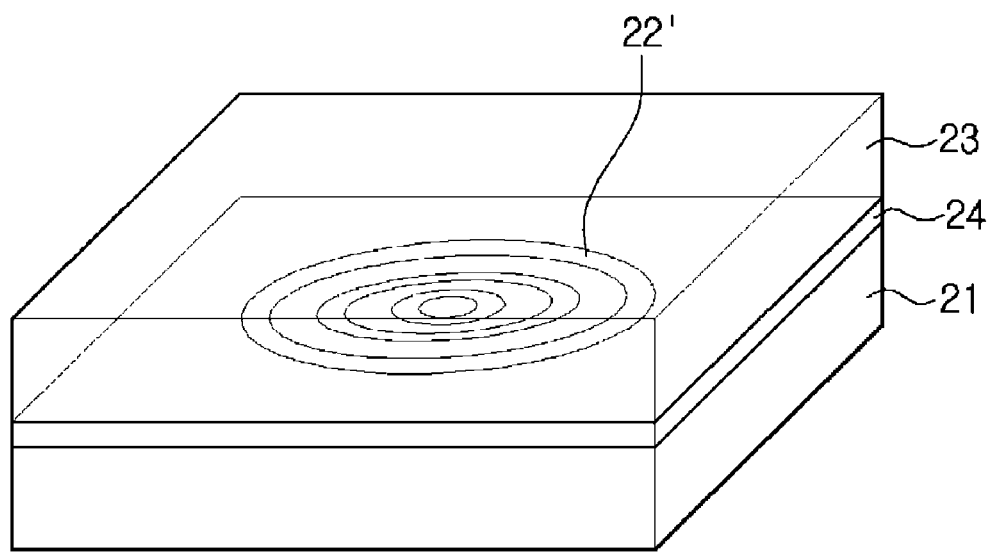
FIG. 9A is a perspective view illustrating a moving member with a sandwich structure in that a metal pattern portion and a protection layer are stacked up in order on the moving member.
Figure 9B:
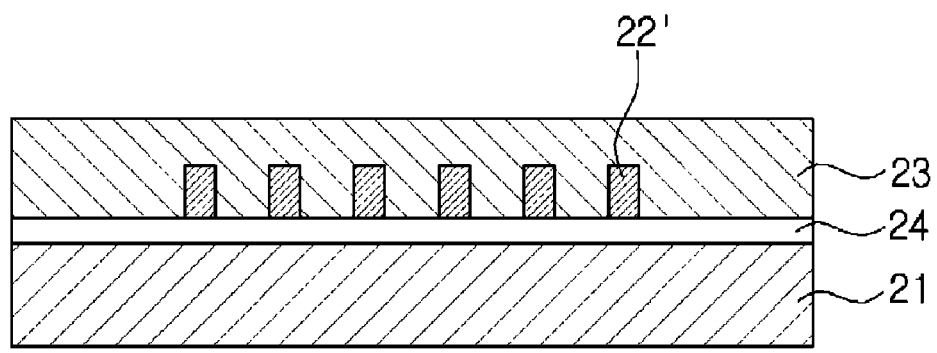
FIG. 9B is a sectional view illustrating the moving member of FIG. 9A.

Referring to FIGS. 9A and 9B, there is a sandwich structure in that a PDMS layer 23 as a protection layer is further formed on the moving member 21 and the pattern portion 22' as illustrated in FIGS. 8A and 8B. That is, the PDMS membrane 21, the polyurea layer 24, the metal pattern portion 22', and the PDMS layer 23 are stacked up in order. The PDMS layer 23 may be formed of liquid PDMS.

Figure 10A:
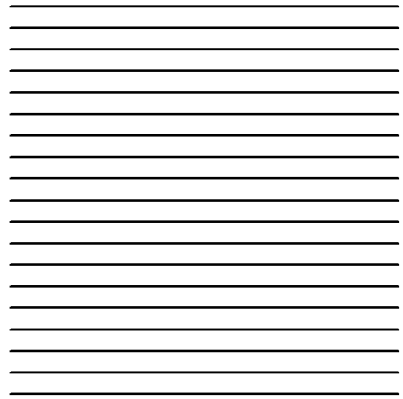
FIGS. 10A to 10D are a view illustrating a horizontal stripe pattern, a vertical stripe pattern, a lattice pattern, and a concentric square pattern, respectively.
Figure 10B:
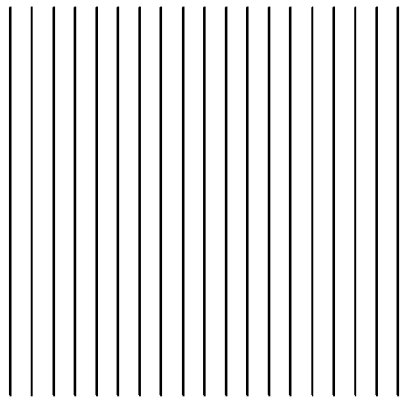
Figure 10C:
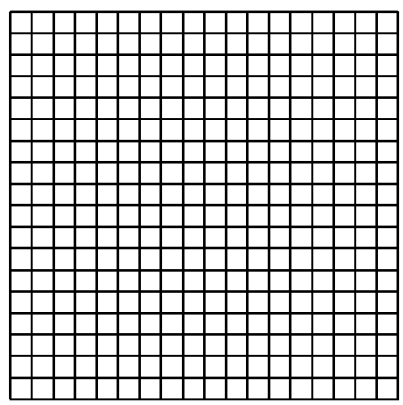
Figure 10D:
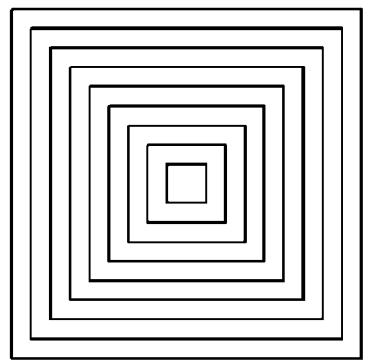

Also, the pattern portion 22 and 22' may block the light beam emitted from the light generator 11 so as to form a predetermined projection pattern 4 on the object 3. The pattern portion 22 and 22' may be formed as various patterns as long as the detector 40 can detect the pattern 4 projected on the object 3 and the image forming unit 50 can form a three-dimensional image of the object 3 using the detected pattern. For example, the pattern portion 22 and 22' may include patterns such as the concentric circle pattern (FIG. 6A), a concentric square pattern (FIG. 10D), a horizontal stripe pattern (FIG. 10A), a vertical stripe pattern (FIG. 10B), and a lattice pattern (FIG. 10C).

The detector 40 may detect the object 3 on which the pattern projecting apparatus 10 projects a predetermined pattern. A charge coupled device (CCD) camera may be used as the detector 40. The three-dimensional imaging apparatus 1 may include at least one detector 40. Two CCD cameras 40 may be used to obtain clearer three-dimensional images.

The image forming unit 50 may use the pattern projected on the object 3 detected by the detector 40 to form a three-dimensional image of the object 3. In other words, the image forming unit 50 may include an imaging program that uses the projection pattern deformed corresponding to a contour of the object 3 to form the three-dimensional image of the object 3. The detector 40 and the image forming unit 50 being used may be those of the conventional three-dimensional imaging apparatus; therefore, detailed descriptions thereof are not repeated.

Figure 11:
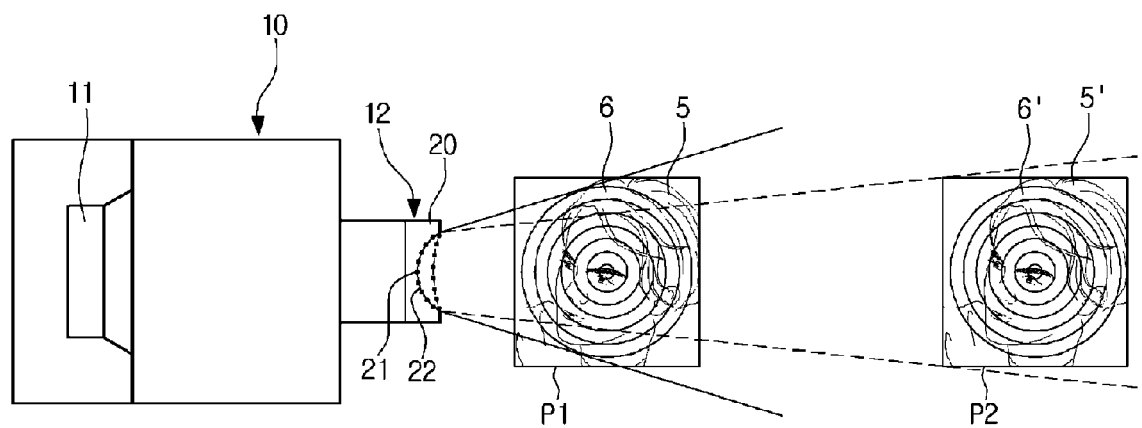
FIG. 11 is a view illustrating a pattern projecting apparatus usable with a three-dimensional imaging apparatus according to an exemplary embodiment of the present invention to project a concentric circle pattern on an object.

Hereinafter, operation of the three-dimensional imaging apparatus 1 having the pattern projecting apparatus 10 according to an exemplary embodiment of the present invention will be explained in detail with reference to FIGS. 1 and 11. However, in order to clearly show operation of the moving member 21 of the varifocal liquid lens 20, in FIGS. 1 and 11, the driving member 34 of the varifocal liquid lens 20 is omitted and the moving member 21 thereof is enlarged.

When the light generator 11 of the pattern projecting apparatus 10 emits a light beam, the light beam enters the varifocal liquid lens 20 of the pattern adjusting unit 12. The light beam entering the varifocal liquid lens 20 passes the optical liquid 32 within the cavity 31 and enters the moving member 21. The light beam to enter the moving member 21 passes the pattern portion 22 and goes to the object 3. Then, because the pattern portion 22 is formed of an opaque material through which the light beam cannot pass, a projection pattern 4 corresponding to the pattern portion 22 is projected on the object 3. For example, if the pattern portion 22 is the concentric circle pattern, as illustrated in FIG. 11, a concentric circle projection pattern 6 and 6' corresponding to the pattern portion 22 is formed on the object 5 and 5'.

At this time, when the focus of the varifocal liquid lens 20 changes, the pattern portion 22 disposed integrally with the moving member 21 of the varifocal liquid lens 20 changes integrally with the moving member 21 so that a user controls the focus of the varifocal liquid lens 20 to change the size of the pattern 6 and 6' projected on the object 5 and 5'. Therefore, the user may properly adjust the size of the pattern 6 and 6' projected on the object 5 and 5' corresponding to the size of the object 5 and 5' so as to obtain a three-dimensional image of the object 5 and 5' with a suitable resolution. At this time, the pressure to be applied to the driving member 34 (see FIG. 4) may be changed so that the focus of the varifocal liquid lens 20 is controlled. The pressure to be applied to the driving member 34 may be controlled by the change of voltage or current. When the pressure to be applied to the driving member 34 changes, the pressure to be applied to the optical liquid 32 changes so that the curvature of the moving member 21 changes. When the curvature of the moving member 21 changes, the focus of the varifocal liquid lens 20 changes.

Also, when a distance between the pattern projecting apparatus 10 and the object 5 and 5' changes, the user adjusts the focus of the varifocal liquid lens 20 so as to constantly maintain the size of the pattern 6 and 6' projected on the object 5 and 5'. For example, as illustrated in FIG. 11, when the object 5 moves from P1 position to P2 position, the user adjusts the focus of the varifocal liquid lens 20 so that the size of the pattern 6' projected on the object 5' in P2 position is the same as the size of the pattern 6 projected on the object 5 in P1 position.

Generally, if the focus of the light beam emitted from the pattern projecting apparatus 10 cannot be adjusted, the distance and the size of the object 5 and 5' of which the three-dimensional image with a predetermined resolution using the pattern projecting apparatus 10 can be obtained is limited. When the object is at a distance nearer than the predetermined distance from the pattern projecting apparatus, the pattern is projected on only a limited portion of the object so that the object has a portion on which the pattern is not projected. Therefore, the three-dimensional imaging apparatus cannot form the three-dimensional image with respect to the portion of the object on which the pattern is not projected. Also, when the object is more distant than the predetermined distance from the pattern projecting apparatus, the pattern becomes wider so that the number of the pattern projected on the object is decreased. Here, the number of the pattern projected on the object means the number of lines forming the pattern projected on the object. For example, in FIG. 11, the number of the pattern means the number of concentric circles. The number of the pattern per unit area of the object may relate to the resolution of the three-dimensional image. Therefore, as the number of the pattern projected on the object is decreased, the resolution of the three-dimensional image of the object is decreased. Also, if the size of the object is smaller or larger than the size of the reference object, problems similar to those as described above may occur.

However, even when the size or the distance of the object 5 and 5' changes, the pattern projecting apparatus 10 according to an exemplary embodiment of the present invention controls the focus of the varifocal liquid lens 20 corresponding to the size or the distance of the object 5 and 5' to constantly maintain the size of the pattern 6 and 6' projected on the object 5 and 5'. Therefore, the three-dimensional imaging apparatus 1 according to exemplary embodiments of the present invention can obtain the three-dimensional image of the object 5 and 5' with a predetermined resolution regardless of the size and the distance of the object 5 and 5'.

Furthermore, the pattern projecting apparatus 10 according to an exemplary embodiment of the present invention controls the focus of the varifocal liquid lens 20 to concentrate the projection pattern on a specific portion of the object 5 and 5'. If the projection pattern is concentrated, the number of the pattern per unit area is increased. Therefore, the three-dimensional imaging apparatus 1 according to exemplary embodiments of the present invention can obtain the three-dimensional image with a high resolution with respect to the specific portion.

After that, the CCD camera of the detector 40 photographs the object 3, and forms an image data including the projection pattern 4 such as the circle pattern. The image forming unit 50 uses the image data generated by the detector 40 to form the three-dimensional image of the object 3. The image forming unit 50 may output the three-dimensional image through an output unit (not illustrated).

The three-dimensional imaging apparatus 1 according to exemplary embodiments of the present invention uses the varifocal liquid lens 20 to widen the parallel light beam corresponding to the object so that it is possible to miniaturize the three-dimensional imaging apparatus 1. Therefore, the three-dimensional imaging apparatus 1 according to exemplary embodiments of the present invention can be disposed within compact mobile apparatuses such as a cellular phone, a digital camera, etc.

Furthermore, the three-dimensional imaging apparatus 1 according to exemplary embodiments of the present invention can adjust the focus of the varifocal liquid lens 20 to variously control the size of the pattern 4 projected on the object 3 and can form a three-dimensional image of the object 3 using the pattern 4 projected on the object 3. Therefore, a range of the size of the object 3 whose three-dimensional image can be formed is broad.

Figure 12:
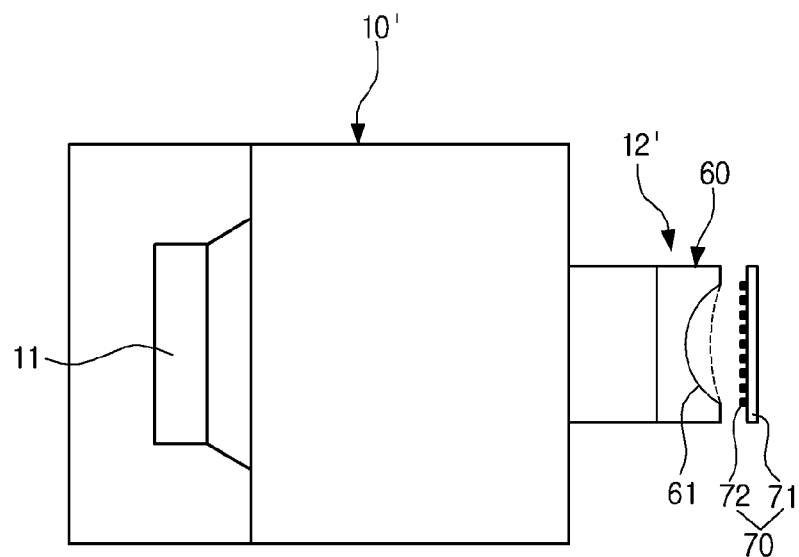
FIG. 12 is a view schematically illustrating a pattern projecting apparatus usable with a three-dimensional imaging apparatus according to another exemplary embodiment of the present invention.

FIG. 12 is a view schematically illustrating a pattern projecting apparatus 10' usable with a three-dimensional imaging apparatus according to another exemplary embodiment of the present invention.

Referring to FIG. 12, the pattern projecting apparatus 10' according to another exemplary embodiment of the present invention may include a light generator 11 and a pattern adjusting unit 12'.

The pattern adjusting unit 12' may include a varifocal liquid lens 60 and a pattern plate 70 that is disposed in front of a moving member 61 of the varifocal liquid lens 60 and is spaced apart from the varifocal liquid lens 60. The varifocal liquid lens 60 is the same as the varifocal liquid lens 20 of the pattern projecting apparatus 10 according to the above-described embodiment except that a pattern portion 72 is not formed on the moving member 61. The pattern plate 70 may include a transparent base plate 71 on which the predetermined pattern portion 72 is formed. The base plate 71 may be formed of a transparent glass wafer, a transparent polymer, etc. The pattern portion 72 may be formed in the same way as or in a similar way to the pattern portion 22 of the pattern projecting apparatus 10 according to the above-described exemplary embodiment.

The light generator 11 may be the same as or similar to the light generator 11 of the pattern projecting apparatus 10 according to the above-described exemplary embodiment. Therefore, a more detailed description thereof is not repeated.

When the focus of the varifocal liquid lens 60 is adjusted, the size of the pattern to be projected on the object by the light beam to pass through the pattern plate 70 is adjusted. The method in that the varifocal liquid lens 60 is used to adjust the size of the pattern projected on the object is the same as or similar to that of the exemplary embodiment as described above. Therefore, a more detailed description thereof is not repeated.

Figure 13:
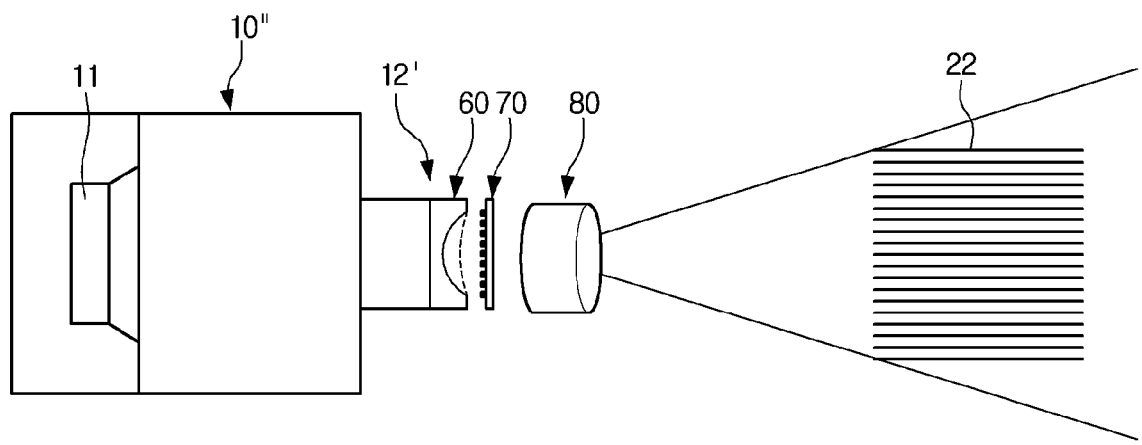
FIG. 13 is a view schematically illustrating a pattern projecting apparatus usable with a three-dimensional imaging apparatus according to another exemplary embodiment of the present invention.

FIG. 13 is a view schematically illustrating a pattern projecting apparatus 10" usable with a three-dimensional imaging apparatus according to another exemplary embodiment of the present invention.

Referring to FIG. 13, the pattern projecting apparatus 10" according to another exemplary embodiment of the present invention may include a light generator 11, a pattern adjusting unit 12', and a pattern changing unit 80.

The light generator 11 and the pattern adjusting unit 12' are the same as the light generator 11 and the pattern adjusting unit 12' of the pattern projecting apparatus 10' as illustrated in FIG. 12. However, the pattern portion 72 formed on the pattern plate 70 of the pattern adjusting unit 12' has a concentric circle pattern.

The pattern changing unit 80 is an optical system that can change the concentric circle pattern into a stripe pattern 22 as illustrated in FIG. 13. The pattern changing unit 80 is the same as or similar to the conventional pattern changing unit. Therefore, a more detailed description thereof is omitted.

Also, the method of using the pattern projecting apparatus 10" according to this exemplary embodiment to adjust the size of the pattern is the same as the pattern projecting apparatus 10 of the exemplary embodiment as described above. Therefore, a more detailed description thereof is not repeated.

In the above-described explanation, the pattern projecting apparatus 10" uses the pattern adjusting unit 12' to include the varifocal liquid lens 60 and the pattern plate 70. Alternatively, the pattern projecting apparatus 10" may use the pattern adjusting unit 12 to include the varifocal liquid lens 20 with the moving member 21 on which the pattern portion 22 is formed.

Hereinafter, a method to manufacture a varifocal liquid lens 20 that can be used in a pattern projecting apparatus 10 usable with a three-dimensional imaging apparatus according to an exemplary embodiment of the present invention is explained with reference to the accompanying drawings.

First, a frame 30 having a cavity 31 is formed. The entire frame 30 may be formed of a transparent material through which light beam can pass. Alternatively, the frame 30 may be formed so that a portion of the frame 30 corresponding to the bottom of the cavity 31 is formed of a transparent material and the other portion of the frame 30 is formed of an opaque material.

Also, a moving member 21 having a predetermined pattern portion 22 is formed. The moving member 21 may be formed of a PDMS membrane that is transparent so that the light beam can pass, and has elasticity. The method of manufacturing the moving member 21 using the PDMS membrane is explained in detail here below.

The moving member 21 is disposed on the frame 30 to cover the cavity 31. Then, an optical liquid 32 is injected into the cavity 31 of the frame 30. A driving member 34 to pressurize the optical liquid 32 received within the cavity 31 of the frame 30 is disposed on the top surface of the frame 30. Then, the manufacture of the varifocal liquid lens 20 is completed.

Hereinafter, the method of manufacturing the moving member 21 using the PDMS membrane is explained.

FIGS. 14A to 14H are process views illustrating the method of manufacturing the moving member 21 of the varifocal liquid lens 20 with a silicon (Si) pattern portion 22.

Figure 14A:
FIGS. 14A to 14H are process views illustrating a method of manufacturing a moving member of a varifocal liquid lens used for a pattern projecting apparatus according to an exemplary embodiment of the present invention.

First, as illustrated in FIG. 14A, a supporting plate 100 is prepared to form the moving member 21 thereon. A silicon plate or a glass plate may be used as the supporting plate 100.

Figure 14B:

Next, as illustrated in FIG. 14B, an anti-stiction material is applied to the supporting plate 100 to form an anti-stiction layer 101. The anti-stiction layer 101 allows the moving member 21 to easily be separated in a final process. The anti-stiction material may include a photoresist, a polymer to have a small surface tension, etc.

Figure 14C:
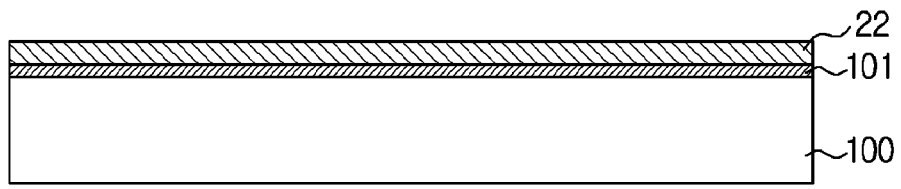

Then, as illustrated in FIG. 14C, a pattern layer 22 that will form the pattern portion later is formed on the anti-stiction layer 101. The pattern layer 22 may be formed of an opaque material through which light beams cannot pass. In this exemplary embodiment, the pattern layer 22 is formed of a silicon layer. At this time, the silicon pattern layer 22 may be formed using a sputtering procedure or an ion beam deposition procedure.

Figure 14D:
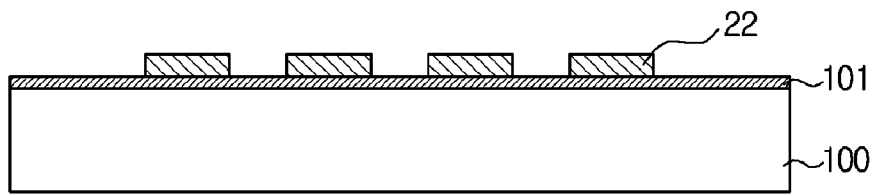

Next, the silicon pattern layer 22 is patterned to form the pattern portion as illustrated in FIG. 14D. At this time, in order to form the silicon pattern layer 22 into a predetermined pattern portion, a photo lithography procedure and an etching procedure of wafer manufacturing procedures may be used.

Figure 14E:
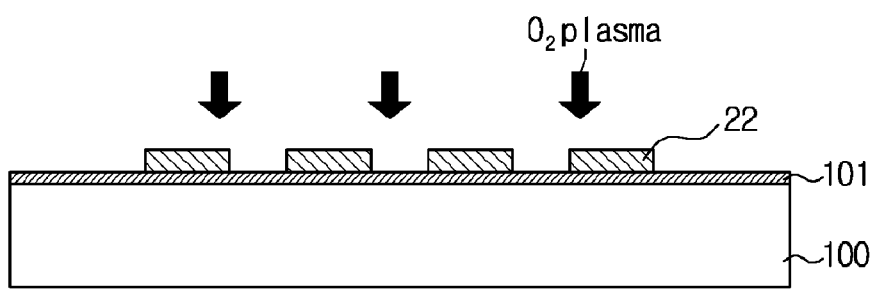

After that, as illustrated in FIG. 14E, the pattern portion 22 is treated with oxygen ($O_2$) plasma. The oxygen plasma treatment modifies the surface of the silicon pattern portion 22 so that the PDMS membrane (moving member) 21 is well attached to the silicon pattern portion 22. Also, one surface of the PDMS membrane 21 that will be attached to the pattern portion 22 is treated with the oxygen plasma. The PDMS membrane 21 treated with the oxygen plasma has a good adhesive strength with respect to the silicon pattern portion 22. At this time, the other surface of the PDMS membrane 21 which is not treated with the oxygen plasma may be supported with a polyethylene terephthalate resin (PET) film 103.

Figure 14F:
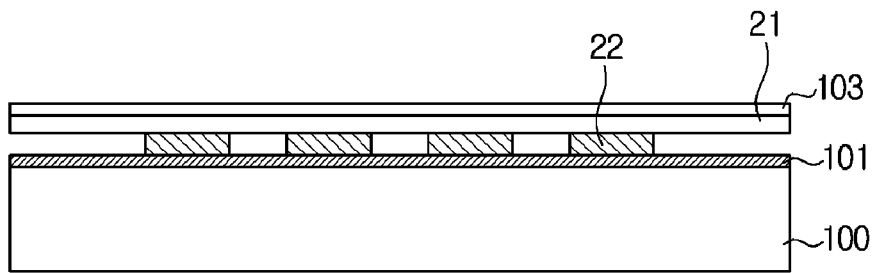

Next, as illustrated in FIG. 14F, the surface of the PDMS membrane 21 treated with the oxygen plasma is attached onto the silicon pattern portion 22 formed on the supporting plate 100. After that, a curing process is performed with respect to the PDMS membrane 21 attached to the silicon pattern portion 22 on the supporting plate 100. In the curing process the PDMS membrane 21 attached to the silicon pattern portion 22 is put in a heating furnace, such as a bake oven, etc., and has been heated for a predetermined period at a predetermined temperature. For example, the PDMS membrane 21 attached to the silicon pattern portion 22 may be heated for 30 minutes at 70° C. (centigrade). Alternatively, the PDMS membrane 21 attached to the silicon pattern portion 22 may be kept for 6 hours at normal temperature. After the curing process finishes, the PDMS membrane 21 is strongly attached to the silicon pattern portion 22.

Figure 14G:
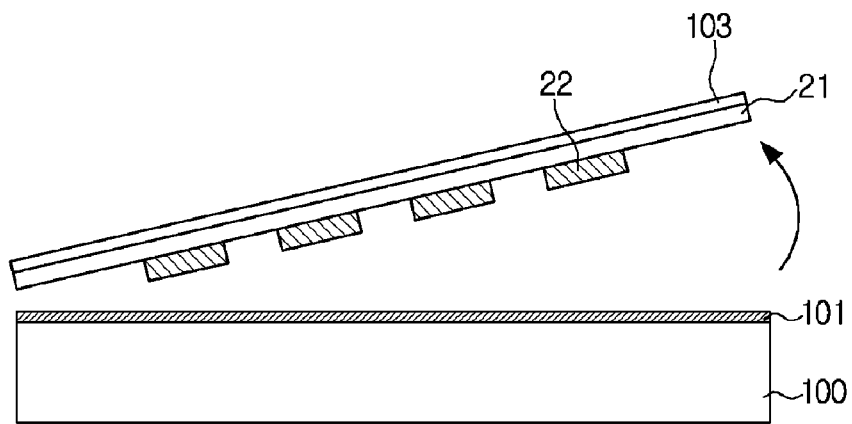

After the curing process, when the PDMS membrane 21 is separated from the supporting plate 100, as illustrated in FIG. 14G, the silicon pattern portion 22 is separated from the supporting plate 100 in state that the silicon pattern portion 22 is attached to the PDMS membrane 21.

Figure 14H:
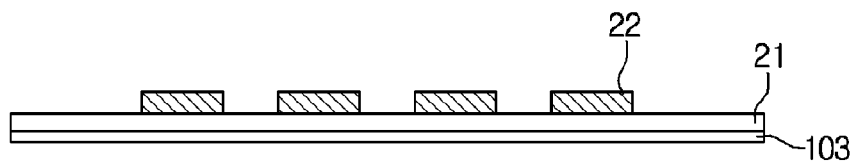

FIG. 14H illustrates the moving member 21 with the silicon pattern portion 22 of which the manufacture is complete.

Figure 15:
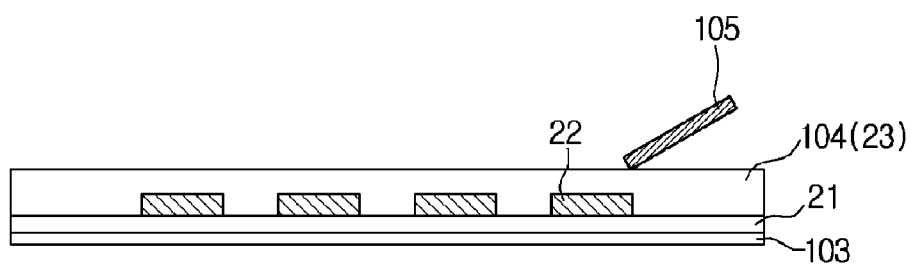
FIG. 15 is a process view illustrating a method of forming a protection layer on a moving member of a varifocal liquid lens used for a pattern projecting apparatus according to an exemplary embodiment of the present invention.

For forming a PDMS protection layer 23 on the moving member 21, after the PDMS membrane 21 is set for the silicon pattern portion 22 to face upward as illustrated in FIG. 14H, liquid PDMS 104 is applied to the silicon pattern portion 22. After that, as illustrated in FIG. 15, the thickness of the PDMS layer 104 is regulated using an applicator 105. Then, the PDMS layer 104 is cured so that the upper PDMS layer 104 is strongly attached to the silicon pattern portion 22, thereby forming the PDMS protection layer 23. At this time, the curing of the PDMS layer 104 may be performed under the same conditions as those of the curing process of the PDMS membrane 21 as described above.

FIGS. 16A to 16I are process views illustrating a method of manufacturing a moving member 21 of a varifocal liquid lens 20 to have a metal pattern portion 22'.

Figure 16A:
FIGS. 16A to 16I are process views illustrating a method of manufacturing a moving member of a varifocal liquid lens used for a pattern projecting apparatus according to an exemplary embodiment of the present invention.

First, as illustrated in FIG. 16A, a supporting plate 100 is prepared to form the moving member 21 thereon. A silicon plate or a glass plate may be used as the supporting plate 100.

Figure 16B:
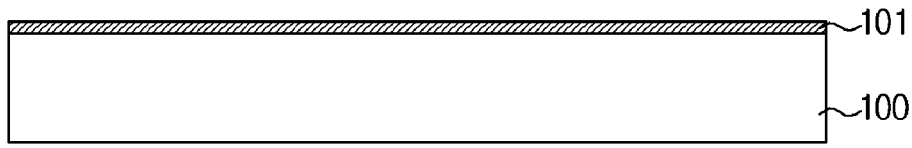

Next, as illustrated in FIG. 16B, an anti-stiction material is applied to the supporting plate 100 to form an anti-stiction layer 101. The anti-stiction layer 101 allows the moving member 21 to easily be separated in a final process. The anti-stiction material may include a photoresist, a polymer to have a small surface tension, etc.

Figure 16C:
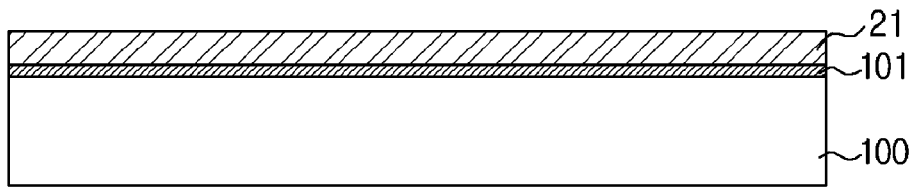

Then, as illustrated in FIG. 16C, a PDMS layer (moving member) 21 (also referred to as a PDMS membrane) is formed on the anti-stiction layer 101. At this time, liquid PDMS may be coated on the anti-stiction layer 101 at a predetermined thickness using a spin coating or an applicator to form the PDMS membrane 21. Alternatively, after a solid PDMS membrane has been prepared in a separate process, the solid PDMS membrane may be attached to the anti-stiction layer 101 on the supporting plate 100.

Figure 16D:
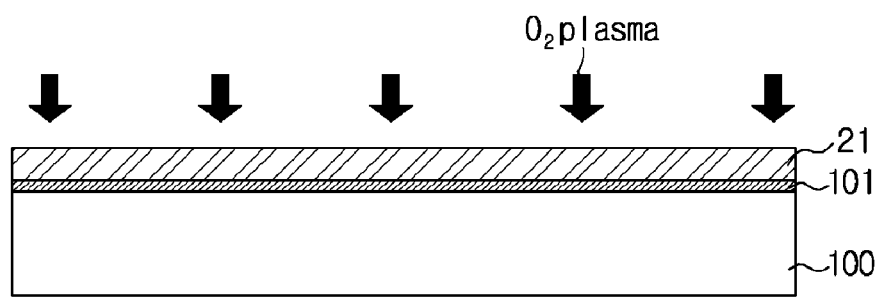

After that, as illustrated in FIG. 16D, the PDMS membrane 21 is treated with oxygen plasma for a surface modification. The oxygen plasma treatment modifies the surface of the PDMS membrane 21 so that the PDMS membrane 21 is well attached to a polyurea layer 24.

Figure 16E:
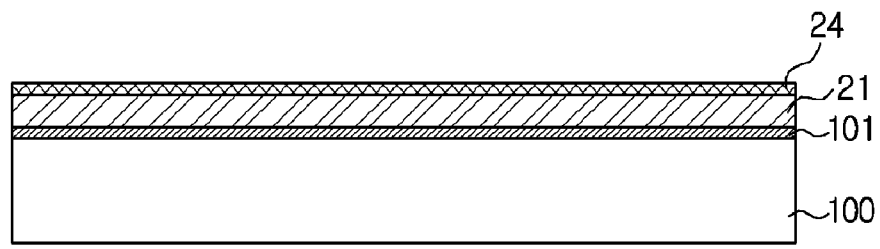

Next, as illustrated in FIG. 16E, the polyurea layer 24 is coated on a top surface of the PDMS membrane 21. At this time, the thickness of the polyurea layer 24 may be in a range between approximately 0.005 μm to approximately 1.0 μm. Alternatively, instead of the polyurea layer 24, on the PDMS membrane 21 may be formed a polymer layer that has a good adhesive strength with respect to the PDMS membrane in the vacuum deposition, is flexible, has high surface tension, and is hydrophilic.

Figure 16F:
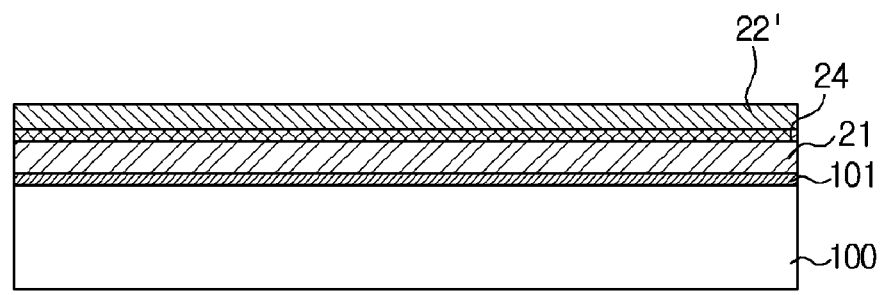

Next, as illustrated in FIG. 16F, a metal layer 22' that will form a pattern portion later is formed on the polyurea layer 24. The metal layer 22' may be formed of an opaque material through which light beams cannot pass. At this time, the metal layer 22' may be formed using a sputtering procedure, an ion beam deposition procedure, an evaporation procedure, etc.

Figure 16G:
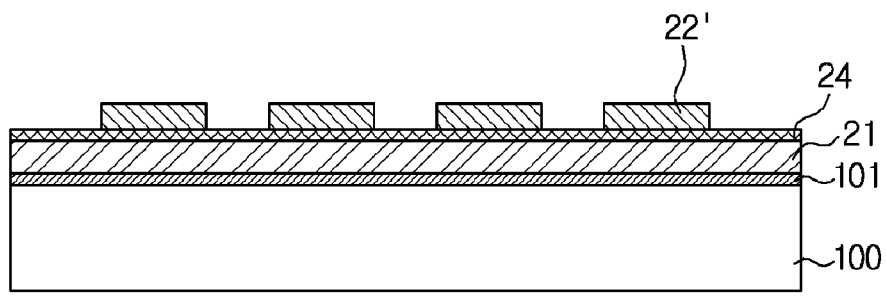

Next, the metal layer 22' is patterned to form the pattern portion as illustrated in FIG. 16G. At this time, in order to form the metal layer 22' into the predetermined pattern portion, a photo lithography procedure and an etching procedure of wafer manufacturing procedures may be used.

Figure 16H:
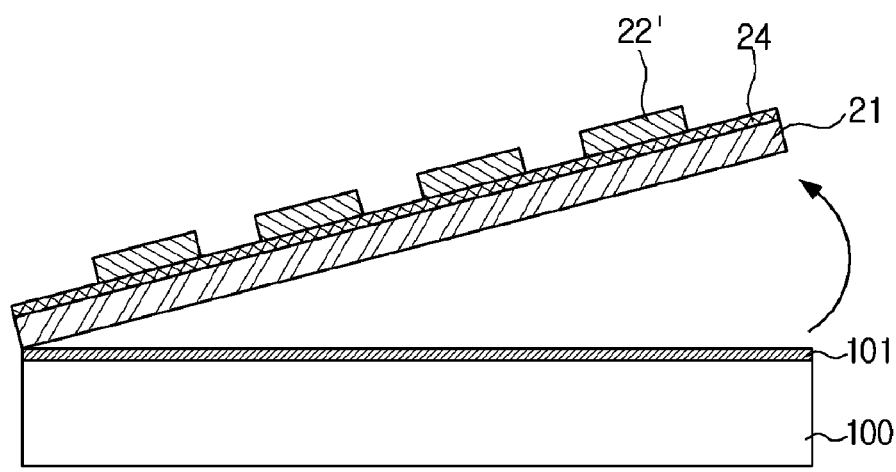

After that, as illustrated in FIG. 16H, the PDMS membrane 21 is separated from the supporting plate 100 so that the moving member 21 is completed.

Figure 16I:
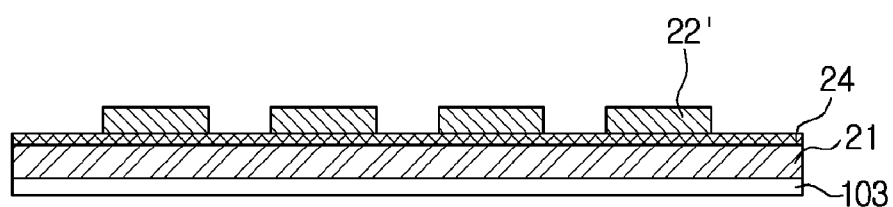

Optionally, as illustrated in FIG. 16I, a PET film 103 may be attached to a surface of the PDMS membrane 21 of the moving member, on which the metal pattern portion 22' is not formed, for protection thereof.

Also, a protection layer 23 (see FIG. 9B) may be formed on the metal pattern portion 22' of FIG. 16I as desired. The process of forming the protection layer 23 has been described above, therefore a more detailed description thereof is not repeated.

While exemplary embodiments of the present invention have been described, additional variations and modifications of the embodiments may occur to those skilled in the art once they learn of the basic inventive concepts. Therefore, it is intended that the appended claims shall be construed to include both the above exemplary embodiments and all such variations and modifications that fall within the spirit and scope of the invention.

What is claimed is:

1. A pattern projecting apparatus comprising:
   a light generator which emits a light beam; and
   a pattern adjusting unit which is disposed in front of the light generator, forms a projection pattern on an object, and adjusts a focus of the light beam emitted from the light generator,
   wherein the pattern adjusting unit comprises a varifocal liquid lens which adjusts the focus of the light beam, and the varifocal liquid lens comprises a moving member which adjusts the focus.

2. The pattern projecting apparatus of claim 1, wherein the moving member comprises a pattern portion which forms the projection pattern on the object.

3. The pattern projecting apparatus of claim 2, wherein the pattern portion is formed in front of the moving member of the varifocal liquid lens and is spaced apart from the varifocal liquid lens.

4. The pattern projecting apparatus of claim 1, wherein the moving member is formed of an elastic membrane, and
   the varifocal liquid lens comprises a frame which supports the elastic membrane and an optical liquid received in a cavity that is formed below the elastic membrane within the frame.

5. The pattern projecting apparatus of claim 4, wherein the elastic membrane comprises a polydimethylsiloxane membrane.

6. The pattern projecting apparatus of claim 1, wherein the pattern portion comprises one of a concentric circle pattern, a horizontal stripe pattern, a vertical stripe pattern, and a lattice pattern.

7. The pattern projecting apparatus of claim 1, wherein the light generator emits the light beam which is of a type selected from a group consisting of infrared rays, visual rays, and ultraviolet rays as a light source.

* * * * *